D. E. GOODENBERGER.
ADJUSTABLE DIE FOR RUBBER EXTRUDING MACHINES.
APPLICATION FILED OCT. 11, 1919.
1,350,722.
Patented Aug. 24, 1920.
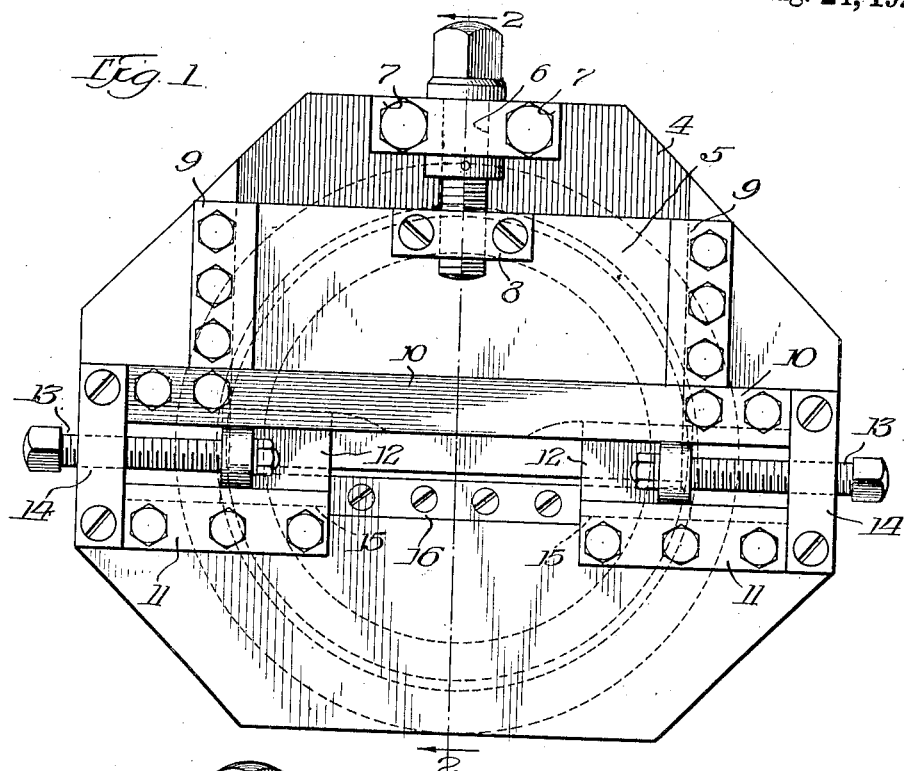
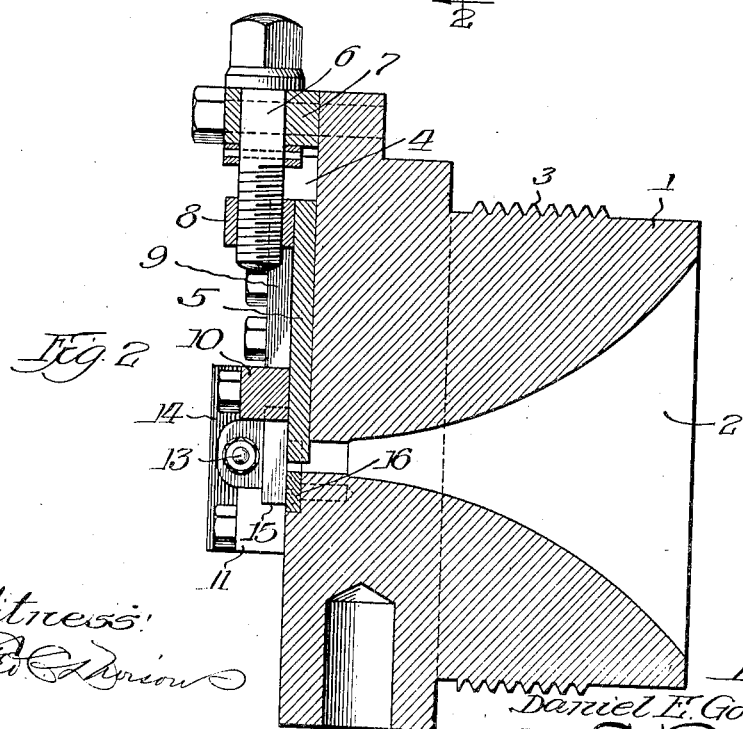
Witness:
Inventor
Daniel E. Goodenberger

UNITED STATES PATENT OFFICE.

DANIEL E. GOODENBERGER, OF AKRON, OHIO, ASSIGNOR TO THE FIRESTONE TIRE AND RUBBER COMPANY, OF AKRON, OHIO, A CORPORATION OF OHIO.

ADJUSTABLE DIE FOR RUBBER-EXTRUDING MACHINES.

1,350,722.        Specification of Letters Patent.        Patented Aug. 24, 1920.

Application filed October 11, 1919. Serial No. 329,954.

*To all whom it may concern:*

Be it known that I, DANIEL E. GOODENBERGER, a citizen of the United States, residing at Akron, in the county of Summit, State of Ohio, have invented certain new and useful Improvements in Adjustable Dies for Rubber-Extruding Machines, of which the following is a specification.

This invention relates to an attachment for rubber extruding machines by which the dimensions of the opening in the die may be adjusted without the necessity of stopping the machine for changing the head of the die.

In the drawings accompanying this application

Figure 1 is a front view of a die showing the adjustable features.

Fig. 2 is a cross section on the line 2—2 of Fig. 1.

In the drawings 1 represents the head of the die through the center of which is the converging passageway 2 through which the rubber is forced by any suitable mechanism. The die is formed with a screw threaded barrel 3 by which it may be secured in the front of the extruding machine. On the front face of the head is formed a vertical recess 4 in which is slidably mounted a plate 5, the lower end of which is arranged to project over the mouth of the die. The plate is adjusted vertically by means of a bolt 6, the upper end of which is rotatably mounted in a lug 7, secured above the recess, the lower end having screw threaded engagement with a boss 8 in the upper side of the plate. A pair of plates 9 are secured to the front face of the head and, overlapping the recess, serve to hold the plate in place.

Across the front of the die, just above the opening 2, is fastened a bridge plate or bar 10, the rear face of which contacts the front of the plate 5 and braces it against the force of the rubber. Below the bar 10 is a pair of guides 11, and between the bar 10 and the last named guides is arranged a pair of slides, or plates, 12, which are adjusted over the face of the plate 5 toward and from the center of the die by bolts 13 connected therewith and having a screw threaded engagement with blocks 14 on the face of the die. The under side of the bar 10 and the upper side of the guide 11 are provided with kerfs or rabbets 15, in which the slides are guided.

The lower side of the mouth of the die is fitted with a removable plate 16 against which the slides bear.

It will be seen that the size of the die opening is determined by the adjustment of the plate 5 with respect to the plate 16 and the lateral adjustment of the slides 12, and that the adjustment may be altered without stopping the operation of the extruding machine. This is a valuable feature of my invention as it is oftentimes necessary to vary the size of the die opening and heretofore such operation has meant the changing of the head, which has occasioned the stopping of the extruding machine with consequent loss in production and possible injury to the stock in the machine. As far as known to me, I am the first to successfully construct and operate an adjustable die for rubber extruding machines, and as such am entitled to a broad range of equivalents in the construction and interpretation of the appended claims. In consideration of the claims I am not limited to specific uses set forth or the exact form shown, but changes and modifications may be made without departing from the spirit of this invention or sacrificing any of its benefits.

I claim:

1. In a machine for extruding rubber or similar material a die, a guideway on the face of the die, a plate slidably mounted in the guideway, means for adjusting the plate to project over the mouth of the die to a greater or less extent, and laterally adjustable plates to vary the width of the opening.

2. In a machine for extruding rubber or similar material, a die head, a guideway on the face of the die head, a plate slidably mounted in the guideway, the lower edge of the plate being arranged to project over the mouth of the die, an adjusting screw for said plate, a plate over said first named plate, and means to adjust said plate laterally with respect to the first named plate to vary the size of the opening.

3. In a machine for extruding rubber or similar material, a die, a vertical guideway on the face of said die, a plate in said guideway, means for adjusting the plate so that its lower edge projects over the mouth of the die to a greater or less extent, a bar secured to the face of the die and extending over the lower half of the plate, a pair of laterally movable plates, slidably mounted in the bar, and means to adjust the last named plates to vary the width of the opening between the lower edge of the first named plate and the mouth of the die.

DANIEL E. GOODENBERGER.